UNITED STATES PATENT OFFICE 2,407,203

α-AMINO-γ-ALKOXYBUTYRIC ACIDS AND METHOD OF PREPARING THE SAME

Quintin P. Cole and Richard O. Roblin, Jr., Old Greenwich, Conn., assignors to American Cyanamid Company, New York, N. Y., a corporation of Maine No Drawing. Application May 29, 1944,
Serial No. 537,968

1 Claim. (Cl. 260—534)

This invention relates to new organic compounds and to a method of preparing the same.

The new compounds of the present invention may be represented by the following general formula:

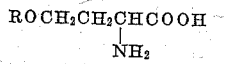

In this formula R is an alkyl radical of from 1 to about 18 carbon atoms. These compounds may be prepared by hydrolyzing 1-alkoxy-3-phthalamidopropane-3,3-dicarboxylic acids. The reaction may be represented by means of the following equation:

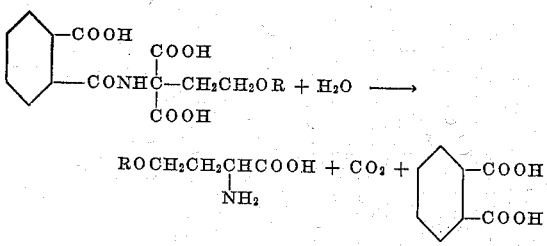

This reaction will be described in detail hereinafter. The new compounds may also be prepared by other methods which will occur to those skilled in the art. Obviously, salts of our new acids may be prepared by simple neutralization with a suitable alkali, ammonia, or a moderately strong amine, or by methods of double decomposition. The acid salts are also formed upon treatment with equivalent amounts of a suitable mineral or organic acid.

The new compounds of the present invention are useful for a variety of purposes. Those in which R is a lower alkyl radical, such as methyl, have antibacterial properties and are useful as germicides and in chemotherapeutic preparations. Those in which R is a higher alkyl radical, for example, octyl, possess surface-active properties and may be used as such or in the form of their alkali or acid salts in the production of wetting agents, detergents, flotation reagents, and the like. Other uses of these new compounds will occur to those skilled in the art.

Preparation of representative members of this new class of compounds will now be described in the following examples, in which their synthesis from readily obtainable intermediates is described. It will be understood, of course, that these examples are intended to be illustrative only, since various modifications in the conditions of the various reactions may be made without departing from the spirit of the invention as defined in the appended claim. All parts are by weight unless otherwise stated.

Example 1

Fifty-seven (57) parts of sodiophthalimidomalonic ester and 39 parts of β-methoxyethyl bromide were heated under reflux for 62 hours. The excess β-methoxyethyl bromide was removed by distillation, and the sodium bromide formed in the reaction was removed by trituration of the product with water. The residue of 2-(β-methoxyethyl)-2-phthalimidomalonic ester was crystallized from alcohol.

Thirty-one (31) parts of 2-(β-methoxyethyl)-2-phthalimidomalonic ester, 40 parts of ethyl alcohol, and 90 parts of 5N aqueous sodium hydroxide were combined and heated under reflux for 1 hour. Strong acidification with hydrochloric acid yielded a precipitate of 1-methoxy-3-phthalamidopropane-3,3-dicarboxylic acid.

Twenty-five (25) parts of 1-methoxy-3-phthalamidopropane-3,3-dicarboxylic acid, 400 parts of water, and 48 parts of concentrated hydrochloric acid were combined and heated on a steam bath for 1½ hours. Two hundred thirty (230) parts of concentrated hydrochloric acid was added, and heating was continued for 45 minutes. The cold solution was filtered to remove phthalic acid, and the filtrate was evaporated to dryness at reduced pressure. The residue, consisting largely of the hydrochloride salt, was taken up in 150 parts of alcohol and 20 parts of pyridine. α-Amino-γ-methoxybutyric acid crystallized from the solution after standing for a short time.

Example 2

Sixty (60) parts of sodiophthalimidomalonic ester and 45 parts of β-butoxyethyl bromide were heated together for 40 hours at 150° C. The excess β-butoxyethyl bromide was removed by distillation at reduced pressure, and the sodium bromide formed in the reaction was removed by trituration with water. The residue of 2-(β-butoxyethyl)-2-phthalimidomalonic ester was crystallized from alcohol.

Thirty-four (34) parts of 2-(β-butoxyethyl)-2-phthalimidomalonic ester, 45 parts of ethyl alcohol, and 100 parts of 5N sodium hydroxide were combined and heated under reflux for 1 hour. The solution was cooled and strongly acidified with hydrochloric acid to precipitate the 1-butoxy-3-phthalamidopropane-3,3-dicarboxylic acid.

Twenty-seven (27) parts of 1-butoxy-3-phthalamidpropane-3,3-dicarboxylic acid, 400 parts of water, and 55 parts of concentrated hydrochloric acid were heated together on a steam bath for 1½ hours. Two hundred sixty (260) parts of concentrated hydrochloric acid was added, and heating was continued for 45 minutes. The cold solution was filtered to remove phthalic acid and the filtrate evaporated to dryness at reduced pressure. The residue was taken up in 150 parts of alcohol and 20 parts of pyridine and yielded α-amino-γ-butoxybutyric acid on standing.

*Example 3*

Fifty-five (55) parts of sodiophthalimidomalonic ester and 45 parts of β-octyloxyethyl bromide were heated together for 20 hours at 160–170° C. The excess β-octyloxyethyl bromide was removed by distillation at reduced pressure, and the sodium bromide formed in the reaction was removed by trituration with water. The residue of 2-(β-octyloxyethyl)-2-phthalimidomalonic ester was crystallized from alcohol.

Thirty (30) parts of 2-(β-octyloxyethyl)-2-phthalimidomalonic ester, 40 parts of ethyl alcohol, and 90 parts of 5N sodium hydroxide were combined and heated under reflux for 1 hour. The solution was cooled and strongly acidified with hydrochloric acid to precipitate the 1-octyloxy-3-phthalamidopropane-3,3-dicarboxylic acid.

Twenty-three (23) parts of 1-octyloxy-3-phthalamidopropane-3,3-dicarboxylic acid, 350 parts of water, and 50 parts of concentrated hydrochloric acid were heated together on a steam bath for 1½ hours. Two hundred fifty (250) parts of concentrated hydrochloric acid was added, and heating was continued for 45 minutes. The cold solution was filtered to remove phthalic acid and the filtrate evaporated to dryness at reduced pressure. The residue, which was taken up in 150 parts of water and 20 parts of pyridine, yielded α-amino-γ-octyloxybutyric acid.

*Example 4*

Fifty (50) parts of sodiophthalimidomalonic ester and 40 parts of β-dodecyloxyethyl bromide were heated together for 20 hours at 160–170° C. The excess β-dodecyloxyethyl bromide was removed by distillation at reduced pressure, and the sodium bromide formed in the reaction was removed by trituration with water. The residue of 2-(β-dodecyloxyethyl)-3-phthalimidomalonic ester was crystallized from alcohol.

Twenty-four (24) parts of 2-(β-dodecyloxyethyl)-2-phthalimidomalonic ester, 35 parts of ethyl alcohol, and 75 parts of 5N sodium hydroxide were combined and heated under reflux for 1 hour. The solution was cooled and strongly acidified with hydrochloric acid to precipitate the 1-dodecyloxy-3-phthalamidopropane-3,3-dicarboxylic acid.

Eighteen (18) parts of 1-dodecyloxy-3-phthalamidopropane-3,3-dicarboxylic acid, 300 parts of water, and 40 parts of concentrated hydrochloric acid were heated together on a steam bath for 1½ hours. Two hundred (200) parts of concentrated hydrochloric acid was added, and heating was continued for 45 minutes. The cold solution was filtered to remove phthalic acid and the filtrate evaporated to dryness at reduced pressure. The residue was taken up in 250 parts of water and 15 parts of pyridine to yield α-amino-γ-dodecyloxybutyric acid.

While hydrochloric acid was employed as the hydrolyzing agent in the foregoing examples, it will be understood that any other moderately strong acid, such as sulfuric, may be used in lieu thereof. The temperature of the hydrolysis may also vary from room temperature up to about 125° C. Of course, at lower temperatures more time is required for the hydrolysis. These factors are within the skill of those in the art, and a detailed discussion thereof is not believed to be necessary.

The compounds of the present invention are generally characterized as being white crystalline solids with high melting points. The compounds are very soluble in water, particularly when R is a short chain alkyl group. They are slightly soluble in alcohol and for the most part insoluble in hydrocarbon and non-polar solvents.

We claim:

α-Amino-γ-methoxybutyric acid.

QUINTIN P. COLE.
RICHARD O. ROBLIN, Jr.